united States Patent Office 3,433,907
Patented Mar. 18, 1969

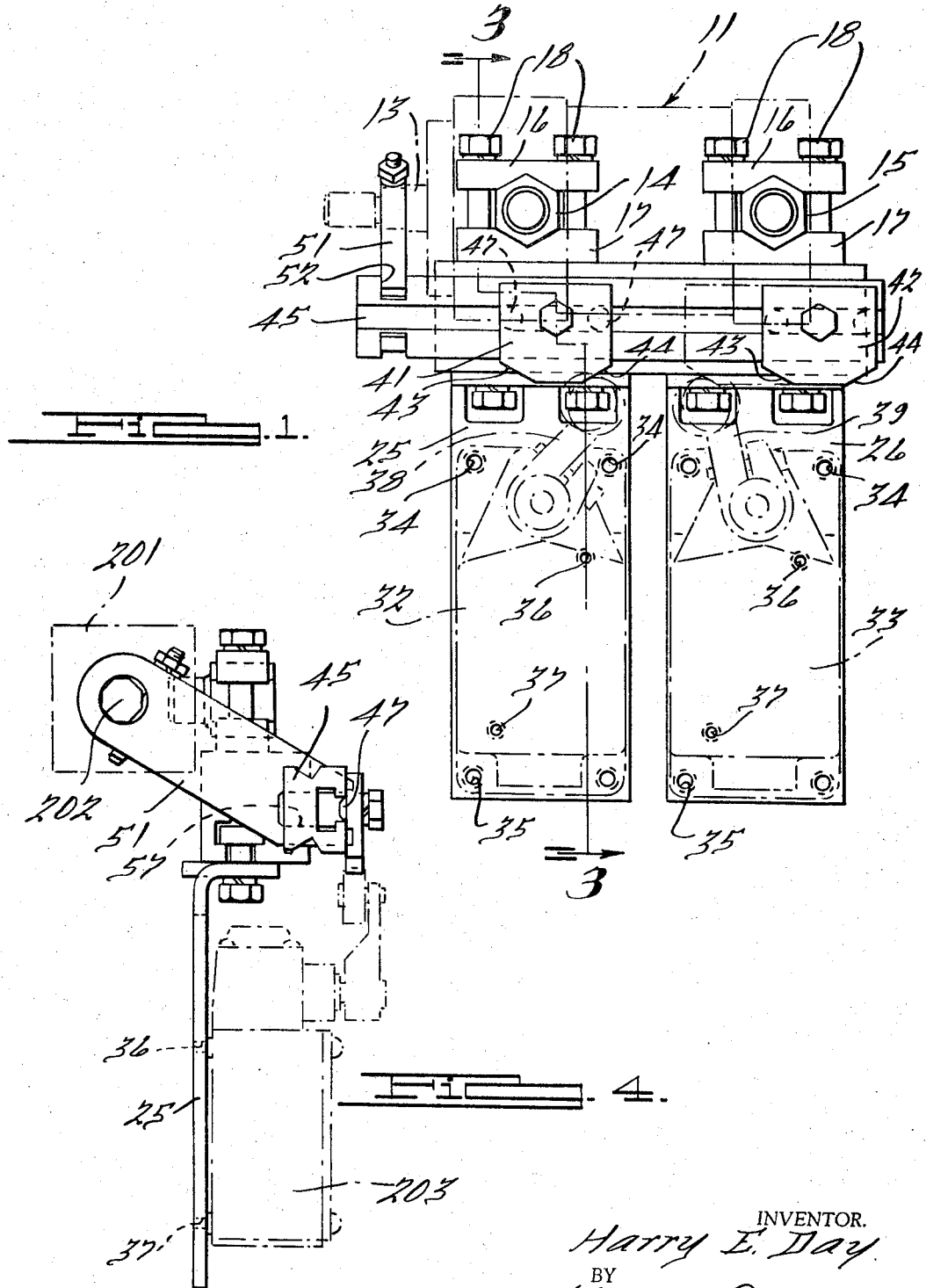

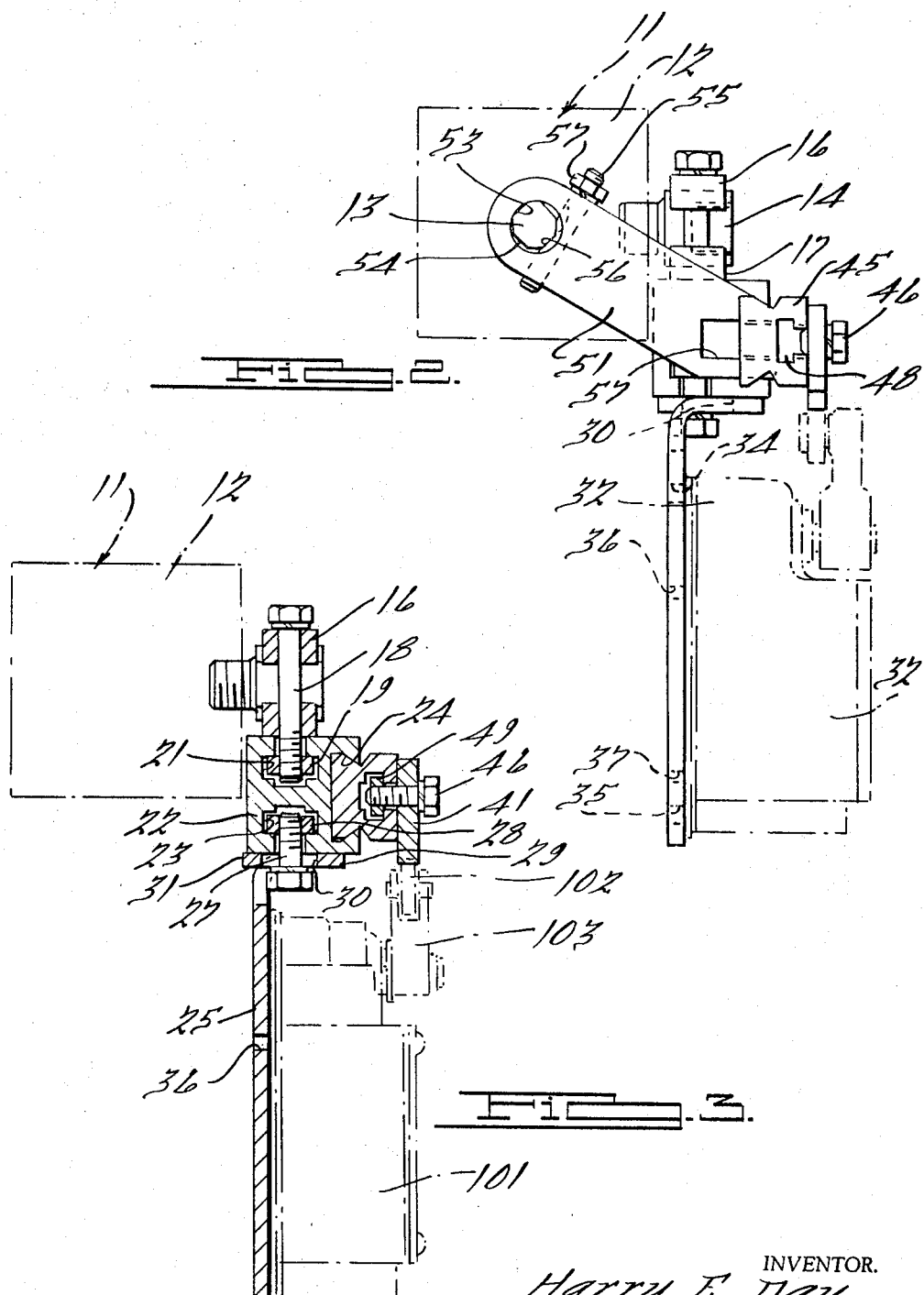

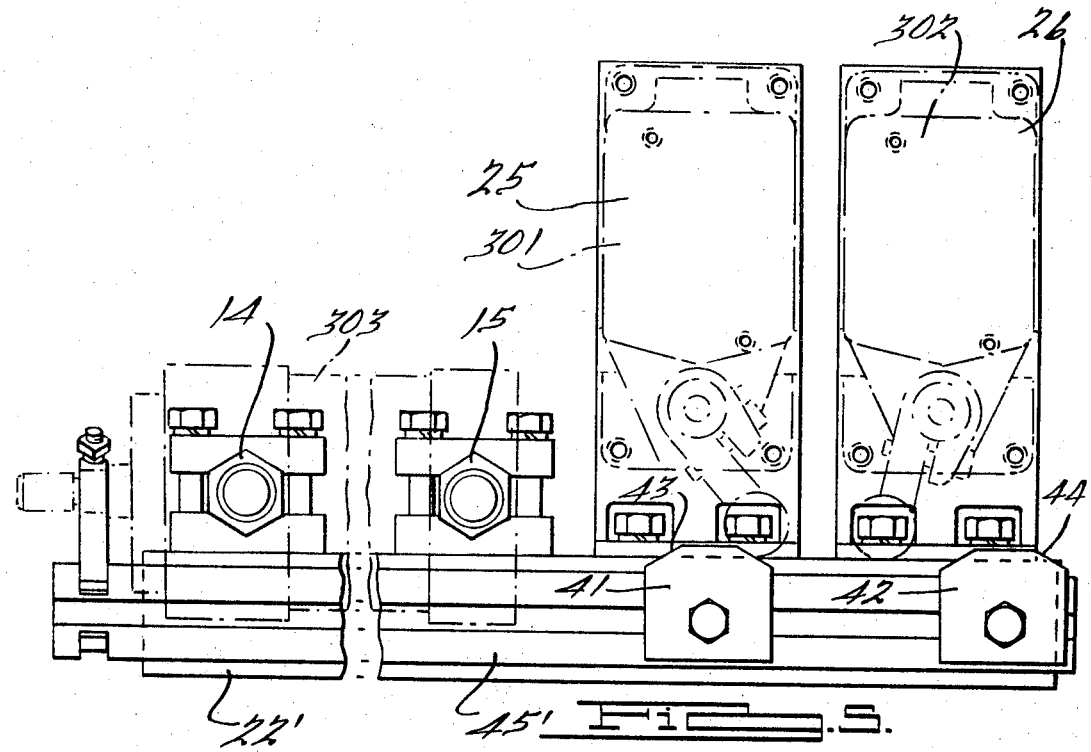
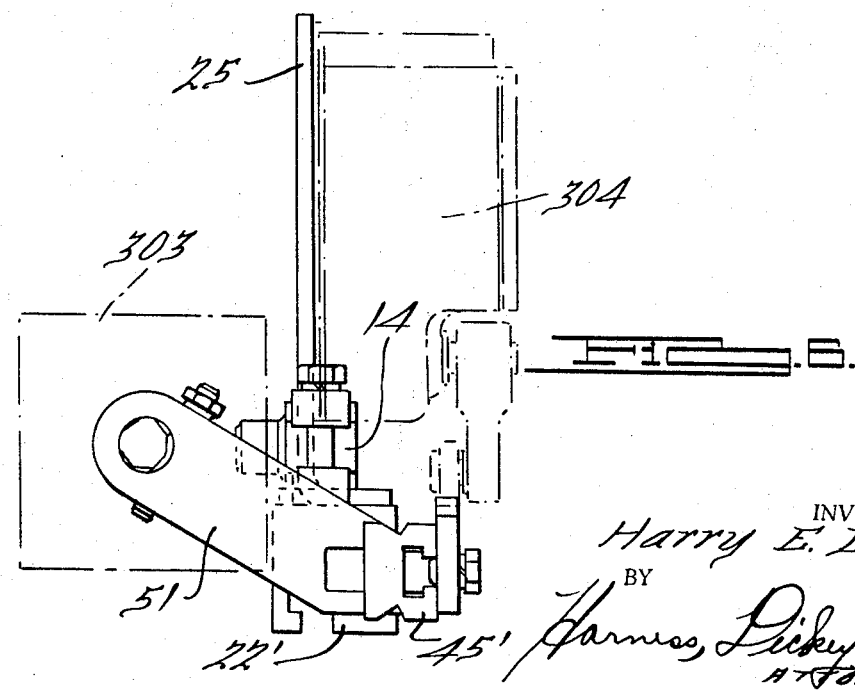

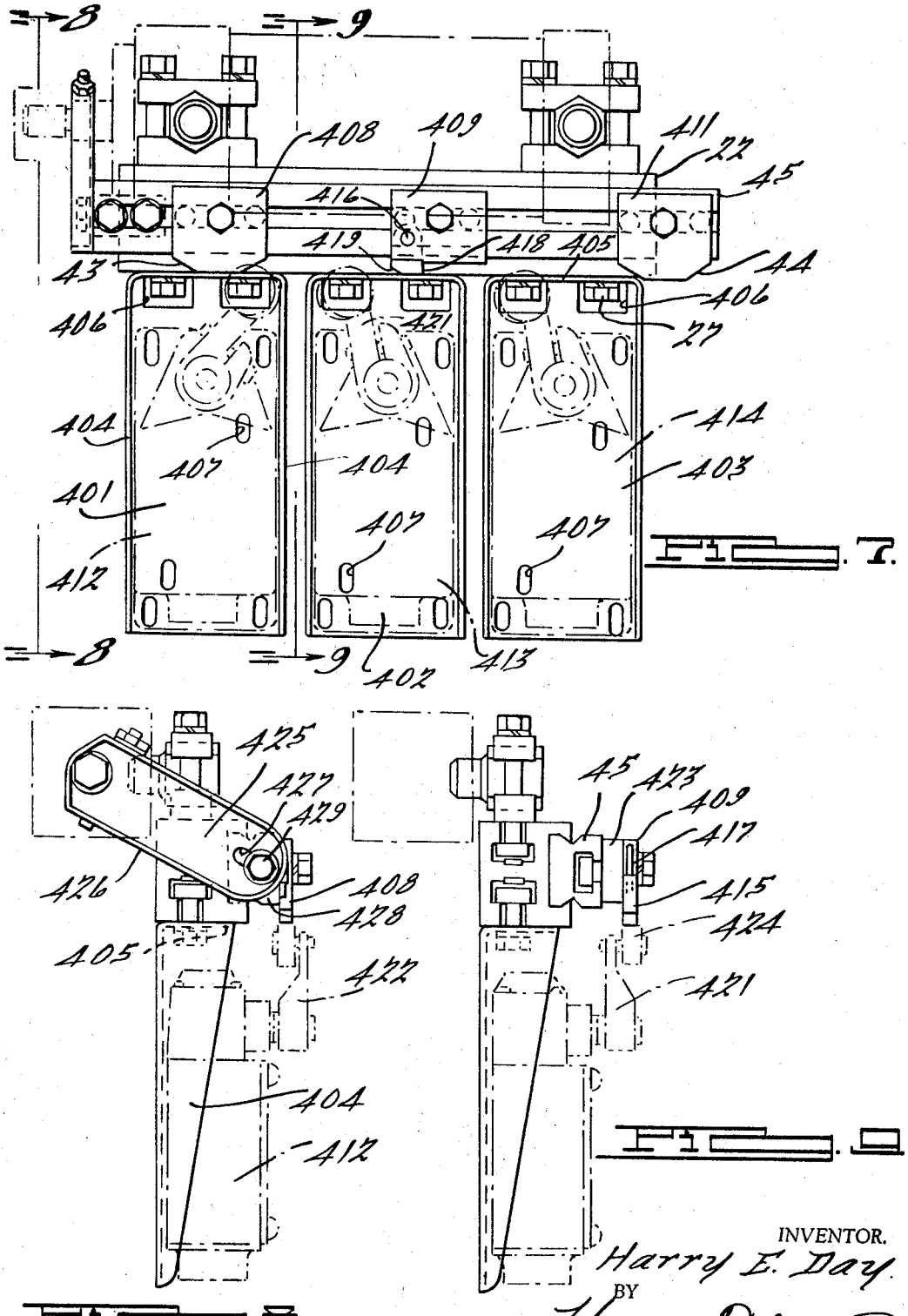

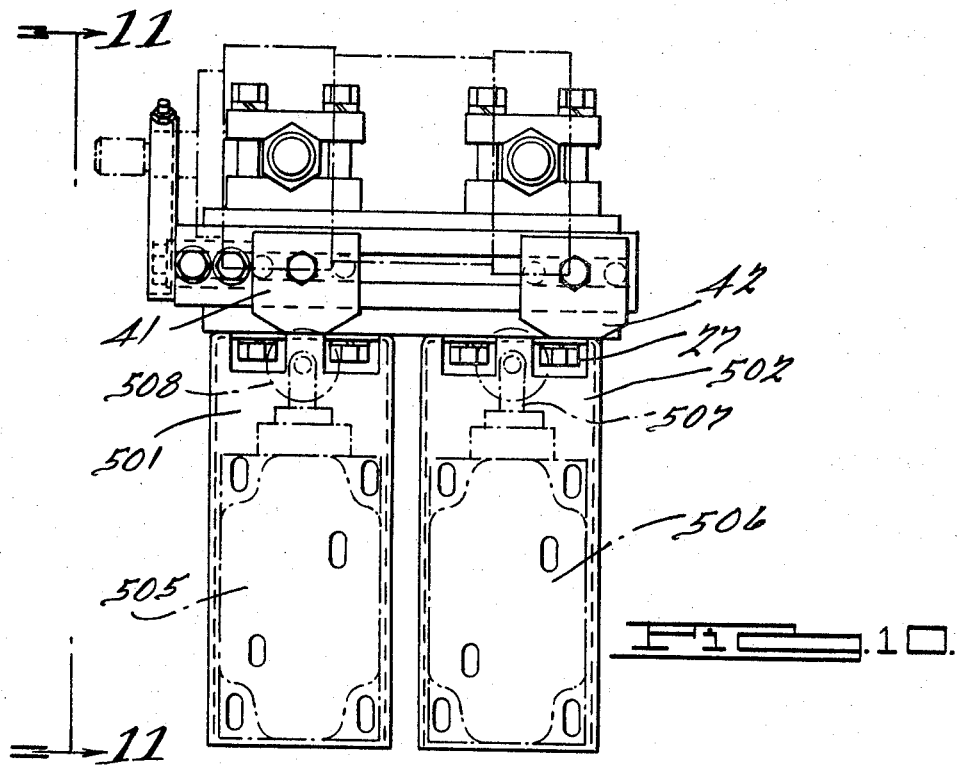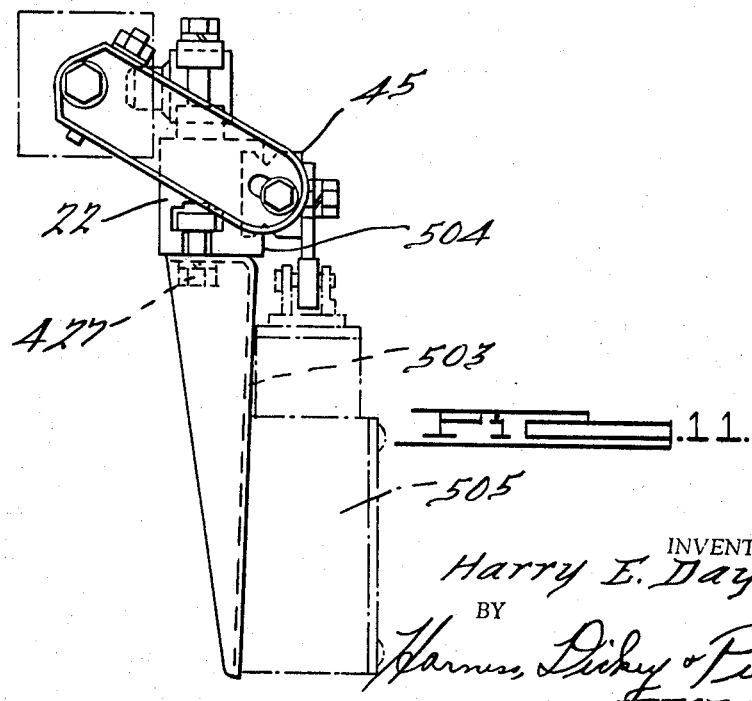

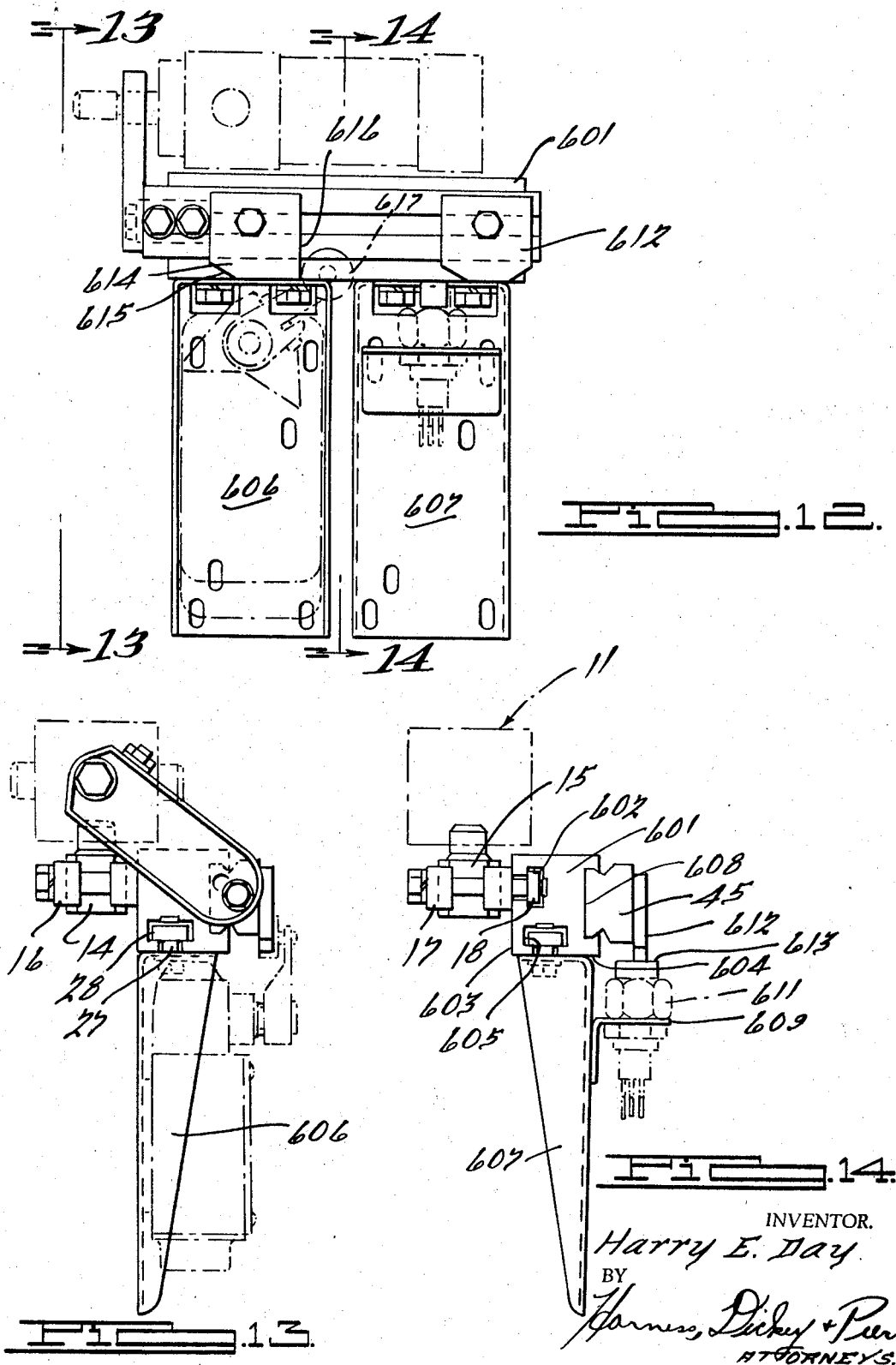

3,433,907
MOUNTING AND ACTUATING MEANS FOR CONTROL DEVICES
Harry E. Day, 19335 Riverside Drive,
Birmingham, Mich. 48009
Filed Feb. 14, 1967, Ser. No. 616,015
U.S. Cl. 200—47         14 Claims
Int. Cl. H01h 3/16, 15/14, 17/12

ABSTRACT OF THE DISCLOSURE

A fluid actuated motor, means for adjustably mounting several limit switches on said motor, and adjustable limit switch actuating means connected to the piston rod. The switches and actuators are supported by a slotted bracket carried by a pair of nipples mounted in the ports at the opposite ends of the motor. The limit switches are carried by a mounting plate adjustably secured to the bracket, the mounting plates being adapted to carry different types of limit switches. The various types of actuators are adjustably secured to a slotted slide mounted on the bracket and connected to the piston rod by an arm.

Background of the invention

*Field of the invention.*—The invention relates to the mounting of machine control devices such as limit switches and their actuators, particularly in automated systems.

*Description of the prior art.*—In automated systems, much of the maintenance difficulty arises from the functioning of control devices such as limit switches due to mounting problems. In the past, control devices in each part of an installation have been mounted in a particular way, involving much labor and many different kinds of parts. According to the invention, a construction is provided whereby limit switches may be mounted adjacent a prime mover such as fluid actuated cylinder in an infinite variety of poistions, and will be held securely, reducing maintenance problems. The invention also permits the mounting of different types of control devices, and does so in an extremely compact arrangement utilizing the fluid actuated motor housing itself to support the parts.

Summary of the invention

The illustrated embodiment of the invention comprises an elongated bracket of rectangular cross-sectional shape and any desired length having a first T-shaped slot extending along one side thereof, a second T-shaped slot along another side, and a dovetail slot along a third side. The bracket is secured by clamps held by one T-slot to a pair of nipples which extend from opposite ends of the fluid actuated motor housing. One or more limit switch mounting plates are secured in side-by-side relation to the bracket by bolts which extend into the second T-slot thereof. The spacing between these mounting plates may be adjusted to any desired distance. A slide is mounted in the dovetail slot and again may be of any desired length. This slide is connected to the piston rod of the motor by an arm, and carries limit switch actuators. These are secured to the side by a T-shaped slot along the side of the slide, and again the spacing may be chosen in accordance with the requirements. The cam surfaces of the actuators may be facing downwardly or upwardly depending on where the limit switch arms are located, and may be spaced at different distances from the bracket. Instead of cam actuated switches, proximity switches may be used.

Brief description of the drawings

In the drawings:
FIGURE 1 is a front elevational view of one embodiment of the invention;
FIGURE 2 is a side elevational view thereof;
FIGURE 3 is a cross-sectional view in elevation taken along the line 3—3 of FIGURE 1, but with a different type of limit switch, the limit switch mounting plates being correspondingly adjusted;
FIGURE 4 is a view similar to FIGURE 2 but showing the invention being used with a smaller cylinder housing and with a still different type of limit switch;
FIGURE 5 is a view similar to FIGURE 1, but showing a different length of bracket and slide to accommodate location of the limit switch mounting plates on top of the bracket;
FIGURE 6 is a side elevational view of the embodiment of FIGURE 5;
FIGURE 7 is a front elevational of still another embodiment of the invention having a different type of switch mounting plate, with three such mounting plates being shown;
FIGURE 8 is a side elevational view of the embodiment of FIGURE 7 taken along the line 8—8 thereof;
FIGURE 9 is a cross-sectional view in elevation taken along the line 9—9 of FIGURE 7;
FIGURE 10 is a front elevational view of another embodiment of the invention in which reciprocating switches are used;
FIGURE 11 is a side elevational view taken along the line 11—11 of FIGURE 10;
FIGURE 12 is a front elevational view of yet another embodiment of the invention in which the switch mounting the bracket is so constructed that the switch mounting plates will extend parallel to rather than at right angles to the cylinder nipples;
FIGURE 13 is a side elevational view taken along the line 13—13 of FIGURE 12; and
FIGURE 14 is a cross-sectional view in elevation taken along the line 14—14 of FIGURE 12.

Description of the preferred embodiments

Referring first to the embodiments of FIGURES 1, 2 and 3, a fluid actuated reciprocable motor is indicated schematically in dot-dash lines at 11 and comprises a cylinder housing 12, a piston (not shown) within the housing, and a piston rod 13 projecting from the housing. A pair of nipples 14 and 15 extend from opposite ends of the housing. These nipples are connected with the fluid ports for the opposite sides of the piston and have hexagonal exterior shapes.

A pair of clamps 16 and 17 engage each nipple 14, these clamps being held together by bolts 18. The bolts extend through the clamps and have square nuts 19 at their lower ends. The nuts are disposed within a T-shaped slot 21 in an elongated bracket 22 which extends parallel to housing 12 and below nipples 14 and 15, and are of sufficient size as to prevent rotation within the slot.

Bracket 22 is constructed of bar stock having a generally rectangular cross-sectional shape, as seen in FIGURE 3. In addition to upwardly open T-slot 21, the bracket has a downwardly open T-slot 23, and a dovetail slot 24 on the side facing away from housing 12. The length of bracket 22 may be chosen to suit requirements. In the embodiments of FIGURES 1 to 3, the length of the bracket is slightly greater than the length of motor 11.

A pair of limit switch mounting plates 25 and 26 are suspended from bracket 22 by means of bolts 27 which have square nuts 28 disposed within T-slot 23. The notch 28 for each pair of bolts 27 holding a mounting plate to bracket 22 may be combined; that is, a single plate may be used instead of two nuts. Plates 25 and 26 are vertically disposed, but have horizontally bent upper portions 29 for securing them to the underside of the bracket. Elongated slots 30 transverse to the plates are formed in portions 29, and sections 31 of portion 29 on each plate have been pressed out to accommodate bolts 27, which extend through slots 30. It will thus be seen that the positions of plates 25 and 26 in a direction perpendicular to the extent of bracket 22 may be varied to suit requirements.

Limit switches 32 and 33 are shown in dot-dash lines in FIGURES 1 and 2 and are secured to plates 25 and 26 respectively by bolts which pass through a pair of upper holes 34 and a pair of lower holes 35. Intermediate holes 36 and 37 are also provided in each mounting plate for accommodating other types of limit switches having different mounting bolt locations.

Limit switches 32 and 33 have arms 38 and 39 respectively, these arms extending upwardly from the limit switches and being pivotally mounted for limit switch actuation. More particularly, limit switch arm 34 is movable from a normal position clockwise toward its actuated position, whereas limit switch arm 39 is movable from its normal position counterclockwise to its actuated position.

The means for actuating these limit switches comprises a pair of actuators 41 and 42 respectively. These actuators are of basically rectangular shape, comprising plates which are beveled at their lower corners 43 and 44 to provide cam surfaces. The plates are secured to an actuator slide 45 by means of bolts 46 and pins 47 extending from the plates on each side of the bolt, the pins and bolt entering a T-shaped slot 48 in slide 45. Nuts 49 are mounted on bolts 46 within slot 48, as seen in FIGURE 3, the nuts being so shaped as to prevent rotation within the slot.

Slide 45 has a dovetail shape which interfits with slot 24 of bracket 22 so that the slide may move back and forth along with the actuators. An arm 51 is secured to piston rod 13 and extends laterally into engagement with a slot 52 at one end of slide 45, as seen in FIGURE 1. Thus, reciprocation of the piston rod will cause corresponding reciprocation of slide 45 and actuators 41 and 42.

Arm 51 has an apertured portion 53 which surrounds piston rod 13 and particularly a portion thereof which has a series of four flats 54 around its circumference. Aperture 53 is somewhat larger than piston rod 13, and a lock screw 55 passes through apertured portions of arm 51. This screw has a cam surface 56 which, when the screw is drawn tight by a nut 57, will lock arm 51 to piston rod by engaging one of the flats 54 thereof.

The other end of arm 51 has an open-ended slot 57 which receives the reduced portion of slot 45 formed by slot 52 thereof. Slot 57 extends in the direction of the axes of nipples 14 so that the connection between arm 51 and slide 45 may be effected regardless of the size, in a horizontal direction, of cylinder housing 12. This function will become apparent later with respect to the description of FIGURE 4.

In setting up the mechanism, mounting plates 25 and 26 will be so adjusted as to insure that the rollers carried by arms 38 and 39 are properly engaged by cams 41 and 42. This will be done by adjusting slots 30 on bolts 27. Cams 41 and 42 will be secured along the length of slide 45 with the proper spacing so that the limit switches will be actuated at the proper time when piston 13 is reciprocated.

The embodiment shown in FIGURE 3 differs from that of FIGURE 2 only in that a different type of limit switch is used, this being indicated at 101. Limit switch 101 has the same locations for mounting holes as switches 32 and 33 but has a different depth. That is, it is thicker in a left-to-right direction as seen in FIGURE 3 than is the switch shown in FIGURE 2. Therefore, in order to assure proper alignment of rollers 102 on arms 103 of switches 101 with cams 41 and 42, portions 29 of plates 25 and 26 will be adjusted by sliding slots 27 to the left from the FIGURE 2 position. It should be noted that the limit switches on plates 25 and 26 need not be of the same type, at least as far as their thickness is concerned, since the mounting plates are independently adjustable.

The embodiment of FIGURE 4 differs from that of the previous embodiment in that a smaller cylinder 201 is used. This will mean that the lateral or left-to-right distance in FIGURE 4 from the axis of piston rod 202 to slide 45 will be less. Thus, slide 45 will be deeper within slot 57 of arm 51. The embodiment of FIGURE 4 differs further from the previous embodiments in that a still different type of limit switch 203 is shown. This limit switch has different locations for the mounting holes; namely, locations matching holes 36 and 37 in mounting plates 25 and 26.

FIGURES 5 and 6 show another embodiment which differs from those previously shown in that the limit switches 301 and 302 are located to one side of cylinder 303 rather than beneath the cylinder. In order to avoid interference between the mounting plates 25 and 26, which support switches 301 and 302 respectively, and nipples 14 and 15, bracket 22 is made longer and so is slide 45. These parts are therefore labeled 22′ and 45′ respectively, in FIGURES 5 and 6. Cams 41 and 42 are mounted in a reverse position; that is, with their beveled corners 43 and 44 facing upwardly rather than downwardly so as to engage the rollers in the limit switch arms.

It should be noted that in the embodiment of FIGURES 5 and 6, mounting plates 25 and 26 are mounted on bracket 22 by means of the upper T-shaped slot 21 thereof rather than the lower T-shaped slot 23.

FIGURES 7, 8 and 9 show another embodiment of the invention which differs from those previously shown mainly in that it illustrates another construction of the limit switch mounting plate as well as of arm 51, and shows three limit switches supported by the bracket. The central limit switch has an arm which is out of the plane of the other two limit switches, and the actuator carried by the slot for this limit switch is similarly spaced. This actuator has a one-way trip dog so as to actuate the limit switch only when moving in one direction.

The three limit switch mounting plates 401, 402 and 403 are mounted beneath bracket 22. Each mounting plate has a flat central portion with a pair of tapered side walls 404, these walls widening from bottom to top. A top flange 405 is contiguous with side walls 404, and portions 406 of the main wall of the mounting plate are cut out to accommodate bolts 27. The mounting holes 407 in plates 401 are elongated in a vertical direction to permit vertical adjustment of the limit switches.

Slide 45 is shown as having three switch actuators 408, 409 and 411 secured thereto, these actuators being utilized for the switches shown in dot-dash lines at 412, 413 and 414 respectively. Actuators 408 and 411 are of the same type described above (actuators 41 and 42), but actuator 409 has a one-way trip dog 415 instead of beveled corners 43 and 44. This trip dog is pivoted at 416 to actuator 409 and is urged in a clockwise direction as seen in FIGURE 7 by a spring 417 (FIGURE 9). The right side 418 of trip dog 415 extends at right angles to the extent of movement of slide 45, the left side 419 being beveled. Trip dog 415 is normally held by a stop (not shown) in its FIGURE 7 position. When trip dog 415 is advancing to the left in FIGURE 7, it will react as surface 419 engages the roller on arm 421, so that no action will result. However, when the trip dog is moving to the right to return to its FIGURE 7 position, surface 418 will engage the roller of arm 421, swinging this arm clockwise, and when it swings far enough trip dog 415 will pass over it.

The position of arm 421, as seen in FIGURE 9, is outwardly of arms 422 of switches 412 and 414. A spacer 423 is provided between slide 45 and an actuator 409, so that trip dog 415 will be aligned with roller 424 on arm 421.

Arm 425 connecting the motor piston with slide 45 differs from arm 51 of the previous embodiments in that it has a surrounding flange 426 and also because it does not have a slot similar to slot 57 of arm 51. Instead, it has an elongated slot 427 at the outer end thereof, this outer end being secured to the end 428 of slide 45 by a bolt 429 extending through slot 427 and threaded into the end of slide 45. In this manner, the necessity of milling slots in slide 45 to accommodate bifurcated ends of the arm is eliminated.

FIGURES 10 and 11 show a two-limit switch embodiment in which the mounting plates 501 and 502 are reversed with respect to their positions in the embodiment of FIGURES 7 and 9. That is, the main portion 503 of each mounting plate is on the side 504 of bracket 22 closer to slide 45. This is accomplished by merely mounting plates 501 and 502 in reverse fashion, using the same bolts 427 as previously, and the result will be that a limit switch 505 can be accommodated which has the limit switch arm disposed within the lateral limits of the limit switch housing. Limit switches 505 and 506 in the embodiment of FIGURES 10 and 11 are of the reciprocating type, that is, they have vertical plungers 507 instead of swinging arms. Their rollers 508 are engageable by cam actuators 41 and 42 in the same manner as previously, except that instead of swinging the limit switch plunger the actuators will cause them to move downwardly. The plungers are urged upwardly by spring means (not shown).

FIGURES 12, 13 and 14 show an embodiment of the invention in which two different types of limit switches are mounted on bracket 601 and the bracket itself is constructed so that the limit switch mounting plates will extend in the same direction as nipples 14 and 15 of cylinder 11. More particularly, T-shaped slot 602 which supports bolts 18 of clamps 16 and 17 is formed in a side 603 of bracket 601 which is adjacent the side 604 having T-shaped slot 605 for bolts 27 of limit switch mounting plates 606 and 607. Dovetail 608 for slide 45 is formed in the side of bracket 601 opposite which has T-shaped slot 602. The result will be that mounting plates 606 and 607 will extend in the same direction as nipples 14 and 15. Of course, the positions of bolts 18 and 27 and their adjacent parts could be reversed.

Note that in FIGURES 12, 13 and 14 the two mounting plates 606, 607 are mounted with opposite orientations (see particularly FIGURES 13 and 14). An L-shaped bracket 609 is secured to mounting plate 607 and carries a proximity limit switch 611. This is a stationary switch which will be actuated by the passage of an actuator 612 of magnetizable material in close proximity with the upper surfaces 613 thereof. It should also be noted that in FIGURE 12 cam actuator 614 is beveled only on one side 615. The other side 616 is perpendicular to the path of travel of the actuator so that when it engages roller 617 during rightward movement as seen in FIGURE 12, it will act as a stop to limit movement of the parts.

It will thus be seen that a limit switch mounting construction has been provided which permits a large variety of limit switch types, numbers and positions, lengths of stroke, mounting hole locations for the switches, and sizes of actuating cylinders. Furthermore, this is all done with a minimum number of parts and these parts may largely be made of bar or extruded stock. The only part which might require more than one size (other than length) is arm 51 or 425. This arm may be made in two or three sizes, each size accommodating a certain range of cylinder sizes.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. In an arrangement for mounting at least one control device in position to be actuated by a reciprocable fluid actuated motor of the type having a piston rod projecting from one end of a motor housing, an elongated bar-like bracket extending alongside and adjacent said housing, means securing said bracket to said housing, said securing means including means for adjusting the relative positions of the bracket and the housing in the direction of their common extent, at least one mounting plate in a plane parallel to the direction of the extent of said bracket and carrying the control device, means securing said mounting plate to said bracket, said last-mentioned securing means including means for adjusting the position of said mounting plate in directions parallel to and at right angles to the direction of extent of said bracket, a slide slidably mounted on said bracket, at least one control device actuating cam, means securing said control device actuating cam to said slide, said last-mentioned securing means including means for adjusting the position of said control device actuating cam in the direction of extent of said slide, and an arm connecting said piston rod and slide for movement in unison.

2. The combination according to claim 1, further provided with a pair of nipples extending from one side of said motor housing, said means for securing said bracket to said housing comprising a pair of clamps secured to said nipples, bolts extending from said clamps, a reentrant slot extending along said bracket, said bolts extending into said slot, and nuts threadably mounted on said bolts.

3. The combination according to claim 1, further provided with a second control device mounting plate, said means for securing said control device mounting plates to said bracket comprising a portion on each mounting plate extending at right angles to the main portion thereof, an elongated slot in said bent mounting plate portion extending transversely to the plane of the main mounting plate portion, a bolt extending through said elongated slot, a reentrant slot in said bracket and extending along the length thereof, said bolt being disposed within said reentrant slot, and a nut threadably mounted on said bolt.

4. The combination according to claim 1, further provided with a second control device actuating cam, said means for slidably mounting said slide on said bracket comprising a reentrant slot formed on said bracket and extending along the length thereof, a portion of said slide being disposed within said reentrant slot, said means for securing said cams to said slide comprising a reentrant slot on said slide, a bolt extending through said cam and entering said reentrant slot, a nut on said last-mentioned bolt, and at least one projection on said cam entering said reentrant slot and spaced from said bolt.

5. The combination according to claim 1, said bracket having a generally rectangular cross-sectional shape, reentrant slots on opposite sides of said bracket and extending along the length thereof, said means for securing said bracket to said housing and said mounting plate to said bracket comprising bolts extending into said reentrant slots and nuts threadably mounted on said bolts, whereby said mounting plate may be mounted on either of opposite sides of said bracket.

6. The combination according to claim 5, the means for slidably supporting said slide comprising a reentrant slot on the side of said bracket facing away from said cylinder, said slide having a reentrant slot, the means for mounting said cam on said slide comprising a reentrant slot on said slide, a bolt extending through said cam and entering said reentrant slot, a nut on said last-mentioned bolt, and at least one projection on said cam entering said reentrant slot and spaced from said bolt, said cam having beveled edges on one side thereof, the mounting means for said cam being such that the beveled edges may face in either of opposite directions with respect to said slide.

7. The combination according to claim 1, further provided with a pair of nipples engageable with one side of said motor housing, said means for securing said bracket to said housing comprising clamping means engageable with said nipples, said bracket having a side facing away from said nipples, said slide being carried on said last-mentioned side of the bracket, said arm having an open slotted portion at the outer end thereof, said last-mentioned slotted portion partially surrounding a portion of said slide having a reduced cross-sectional shape, whereby the position of said reduced slide portion in said open slotted portion of the arm will be varied depending upon the distance of said slide from said piston rod.

8. The combination according to claim 6, further provided with means for securing said arm to said piston rod comprising a flatted portion on said piston rod, an apertured portion in said arm surrounding said flatted piston rod portion, and a clamping screw passing through said arm and having an inclined surface engageable with the flatted portion of said piston rod.

9. The combination according to claim 1, said bracket having a generally rectangular cross-sectional shape, a first reentrant slot on one side of said bracket and extending along the length thereof, and a second reentrant slot along an adjacent side of said bracket and extending along the length thereof, said means for securing said bracket to said housing and said mounting plate to said bracket comprising bolts extending into said reentrant slots and nuts threadably mounted on said bolts.

10. The combination according to claim 1, said mounting plate comprising a flat member having tapered parallel side walls along opposite edges thereof and a top flange contiguous with said side walls, the main body of said mounting plate having a plurality of apertured portions elongated in the direction of extent of said side walls whereby a control device may be mounted thereon in a variety of positions.

11. The combination according to claim 1, said control device actuating cam comprising a member at least a portion of which is formed of paramagnetic material whereby a proximity type of limit switch secured to said mounting plate may be actuated thereby.

12. The combination according to claim 1, said control device actuating cam comprising a member having a sloping surface facing in one direction thereof and a surface facing in the other direction thereof which is at right angles to the direction of movement of said slide, whereby said last mentioned surface will act to limit the slide travel.

13. The combination according to claim 1, further provided with a second control device mounting plate, a second control device actuating cam carried by said slide, a pair of limit switches on said mounting plates, the actuating arms for said limit switches being spaced at different distances from said slide, said first switch actuating cam being aligned with the arm of one of said limit switches, and a spacer between said second control device actuating cam and said slide, whereby the second control device actuating cam will be aligned with the arm of said second limit switch.

14. The combination according to claim 1, said arm connecting the piston rod and slide comprising an elongated member having one end secured to the piston rod, an elongated slot in the other end of said member, and a bolt passing through said slot and securing said other end of the elongated member to the end of said slide.

References Cited

UNITED STATES PATENTS 3,190,396   6/1965   Strum _____ 200—153.12

ROBERT K. SCHAEFER, *Primary Examiner.*

DAVID SMITH, JR., *Assistant Examiner.*

U.S. Cl. X.R.

200—168, 153; 74—107